No 688.
No. 801 —
Martin H. Crane
Design for Metallic Burial Cases
Patented January 23. 1855.—
Reissued Mch 14. 1855
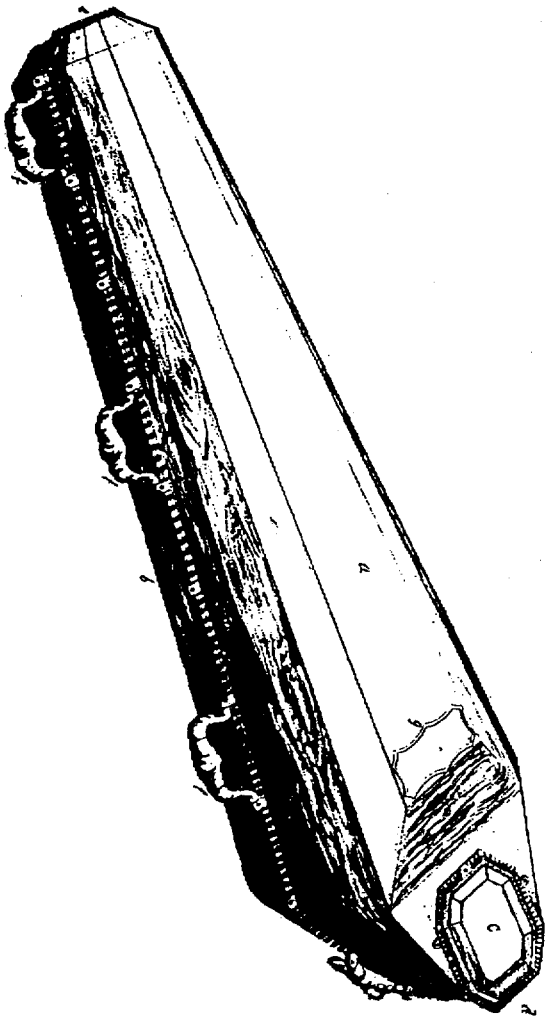

UNITED STATES PATENT OFFICE.

MARTIN H. CRANE, OF CINCINNATI, OHIO, ASSIGNOR TO CRANE, BREED & CO.

DESIGN FOR A METALLIC COFFIN.

Specification forming part of Design No. 688, dated January 23, 1857; Reissue No. 301, dated March 13, 1855.

*To all whom it may concern:*

Be it known that MARTIN H. CRANE, of Cincinnati, Hamilton county, Ohio, invented a new ornamental Design for Metallic Burial-Cases; and we do hereby declare the following to be a full and exact description of the same, reference being had to the annexed drawing, making part of this specification, and in which the burial-case is represented in perspective.

The upper portion or cover, *a*, is polygonal in transverse section, and is bolted or screwed as well as luted to the lower portion, *b*. The case follows, to some extent, the human form, being higher over the chest and narrowing to both ends from the shoulders. At the head end, on the top, is an octagonal opening surrounded by a ring containing a light of glass, which is again covered by a cap, *c*. This ring *d* has a molding around it, and the cap *c* has a bead, as represented. The lower edge of the upper section, *a*, has a molded flange, *e*, projecting from it. On the site above the chest is a bead, *g*, forming a molding to surround and protect the name-plate.

What we claim as new herein, and as the invention of MARTIN H. CRANE, is—

The ornamental polygonal design for a metallic burial case or coffin, substantially as described and represented.

In witness whereof we hereunto set our hands before two subscribing witnesses.

M. H. CRANE.
A. D. BREED.
JOHN MILLS.

Witnesses:
O. D. WHITE,
JAMES CALHOUN.